US012632957B2

(12) United States Patent
Brauer et al.

(10) Patent No.: US 12,632,957 B2
(45) Date of Patent: May 19, 2026

(54) METHODS AND SYSTEMS FOR USE IN PROCESSING IMAGES RELATED TO CROPS

(71) Applicant: MONSANTO TECHNOLOGY LLC, Saint Louis, MO (US)

(72) Inventors: Robert Brauer, Lincoln, NE (US); Nima Hamidi Ghalehjegh, Chesterfield, MO (US)

(73) Assignee: MONSANTO TECHNOLOGY LLC, Saint Louis, MO (US)

( * ) Notice: Subject to any disclaimer, the term of this patent is extended or adjusted under 35 U.S.C. 154(b) by 574 days.

(21) Appl. No.: 17/956,679

(22) Filed: Sep. 29, 2022

(65) Prior Publication Data

US 2023/0100004 A1 Mar. 30, 2023

Related U.S. Application Data

(60) Provisional application No. 63/250,629, filed on Sep. 30, 2021.

(51) Int. Cl.
*G06T 7/00* (2017.01)
*G06V 10/44* (2022.01)
(Continued)

(52) U.S. Cl.
CPC .......... *G06T 7/0012* (2013.01); *G06V 10/454* (2022.01); *G06V 10/764* (2022.01);
(Continued)

(58) Field of Classification Search
CPC .... G06V 10/764; G06V 10/454; G06V 10/82; G06V 20/17; G06V 20/188;
(Continued)

(56) References Cited

U.S. PATENT DOCUMENTS

2012/0250962 A1 10/2012 Scharf et al.
2015/0071528 A1 3/2015 Marchisio et al.
(Continued)

OTHER PUBLICATIONS

Machefer, M.; Lemarchand, F.; Bonnefond, V.; Hitchins, A.; Sidiropoulos, P. Mask R-CNN Refitting Strategy for Plant Counting and Sizing in UAV Imagery. Remote Sens. 2020, 12, 3015. https://doi.org/10.3390/rs12183015 (Year: 2020).*
(Continued)

*Primary Examiner* — Emily C Terrell
*Assistant Examiner* — Jacqueline R Zak
(74) *Attorney, Agent, or Firm* — Harness, Dickey & Pierce, P.L.C.

(57) ABSTRACT

Systems and methods for processing image data associated with plots are provided. One example computer-implemented method includes accessing a data set including multiple images, a mask for each of the images, and classification data for each of the images, and inputting each of the images to a classifier of a model architecture. The method also includes, for each of the images input to the classifier, generating, by an encoder of the model architecture, a latent image from the input image; generating, by a decoder of the model architecture, an output mask from the latent image; determining, by the classifier, an output classification indicative of a type of crop in the image; comparing the output mask to the corresponding mask in the data set; comparing the output classification to the corresponding classification data in the data set; and modifying a parameter of the model architecture based on the comparisons.

19 Claims, 6 Drawing Sheets

(51) Int. Cl.

| | |
|---|---|
| *G06V 10/764* | (2022.01) |
| *G06V 10/82* | (2022.01) |
| *G06V 20/10* | (2022.01) |
| *G06V 20/17* | (2022.01) |

(52) U.S. Cl.
CPC .............. *G06V 10/82* (2022.01); *G06V 20/17* (2022.01); *G06V 20/188* (2022.01); *G06T 2207/10032* (2013.01); *G06T 2207/20024* (2013.01); *G06T 2207/20081* (2013.01); *G06T 2207/20084* (2013.01); *G06T 2207/30188* (2013.01)

(58) Field of Classification Search
CPC . G06T 2207/10032; G06T 2207/30188; G06T 7/11; G06T 2207/20081; G06N 3/045; G06N 3/08
See application file for complete search history.

(56) References Cited

U.S. PATENT DOCUMENTS

| | | |
|---|---|---|
| 2016/0171680 A1 | 6/2016 | Lobell |
| 2018/0189564 A1 | 7/2018 | Freitag et al. |
| 2018/0211156 A1 | 7/2018 | Guan et al. |
| 2020/0074605 A1 | 3/2020 | Goyal et al. |
| 2020/0125929 A1 | 4/2020 | Guo et al. |
| 2020/0342226 A1 | 10/2020 | Bengtson et al. |
| 2021/0012109 A1* | 1/2021 | Chou ..................... G06V 10/82 |
| 2021/0153500 A1 | 5/2021 | Kuenzi |
| 2021/0201024 A1 | 7/2021 | Lin et al. |
| 2021/0247313 A1 | 8/2021 | Ogawa |
| 2021/0286998 A1* | 9/2021 | Wilson ..................... G06N 3/08 |
| 2021/0312591 A1 | 10/2021 | Ren et al. |
| 2021/0397836 A1 | 12/2021 | Li et al. |
| 2022/0198221 A1 | 6/2022 | Avegliano et al. |
| 2022/0217894 A1 | 7/2022 | Guo et al. |
| 2022/0327815 A1* | 10/2022 | Picon Ruiz ............. G06T 7/001 |
| 2022/0335715 A1 | 10/2022 | Geach et al. |

OTHER PUBLICATIONS

Machefer, M.; Lemarchand, F.; Bonnefond, V.; Hitchins, A.; Sidiropoulos, P. Mask R-CNN Refitting Strategy for Plant Counting and Sizing in UAV Imagery. Remote Sens. 2020, 12, 3015. (Year: 2020).*

P. Lottes, J. Behley, N. Chebrolu, A. Milioto and C. Stachniss, "Joint Stem Detection and Crop-Weed Classification for Plant-Specific Treatment in Precision Farming," 2018 IEEE/RSJ International Conference on Intelligent Robots and Systems (IROS), Madrid, Spain, 2018, pp. 8233-8238. (Year: 2018).*

Birla. "Single Image Super Resolution Using GANS—Keras," In: medium.com, Nov. 8, 2018, 9 pgs.

Shendryk et al. "Integrating satellite imagery and environmental data to predict field-level cane and sugar yields in Australia using machine learning." In: Field Crops Research, vol. 260. Jan. 1, 2021, 13 pgs.

Mai et al. "Batch Inverse-Variance Weighting: Deep Heteroscedastic Regression." In: arXiv; Jul. 9, 2021, 15 pgs.

Kulkarni et al. "Semantic Segmentation of Medium-Resolution Satellite Imagery using Conditional Generative Adversarial Networks"; AI for Earth Sciences Workshop at NeurIP 2020; 7 pgs.

Isola et al. "Image-to-Image Translation with Conditional Adversarial Networks"; Berkeley AI Research (BAIR) Laboratory, UC Berkeley, Nov. 26, 2018; 17 pgs.

Kwak et al. "Two-stage Deep Learning Model with LSTM-based Autoencoder and CNN for Crop Classification Using Multi-temporal Remote Sensing Images." In: Korean Journal of Remote Sensing, vol. 37, No. 4, 2021; Aug. 23, 2021;13 pages.

Tenreiro et al. "Using NDV1 for the assessment of canopy in agricultural crops within modelling research." In: Computers and Electronics in Agriculture 182 (2021), Feb. 22, 2021;12 pages.

Ellinger, Understanding Spatial Resolution with Drones, TLT Photography, 2017 (Year: 2017), 8 pages.

Roman et al., Noise Estimation for Generative Diffusion Models, arXiv, Sep. 12, 2021 (Year: 2021), 11 pages.

Gandikota et al., RTC-GAN Real-Time Classification of Satellite Imagery Using Deep Generative Adversarial Networks With Infused Spectral Information, IEEE, 2020 (Year: 2020), 4 pages.

Jiang et al., GAN-Based Multi-Level Mapping Network for Satellite Imagery Super-Resolution, IEEE, 2019 (Year: 2019), 6 pages.

Liu et al., PSGAN a Generative Adversarial Network for Remote Sensing Image Pan-Sharpening, IEEE, 2018 (Year: 2018), 5 pages.

* cited by examiner

METHODS AND SYSTEMS FOR USE IN PROCESSING IMAGES RELATED TO CROPS

CROSS-REFERENCE TO RELATED APPLICATION

This application claims the benefit of, and priority to, U.S. Provisional Application No. 63/250,629, filed on Sep. 30, 2021. The entire disclosure of the above application is incorporated herein by reference.

FIELD

The present disclosure generally relates to methods and systems for use in processing images related to fields, plots, and/or crops included in the fields or plots, for example, in connection with determining (e.g., predicting, forecasting, etc.) phenotypic expression(s) in crops, identifying and/or locating the crops in the fields or plots, etc.

BACKGROUND

This section provides background information related to the present disclosure which is not necessarily prior art.

Crops are planted, grown and harvested in various regions. After planting the crops, depending on types of the crops, the crops often follow a progression through different growth stages until harvest. For example, the different growth stages may include germination, leaf visibility, heading, flowering, etc., which vary by particular types of crops. In connection with crop analysis, it is known for individuals to enter the fields, or plots, and assess the growth stage(s) of the crops based on both visual and analytical techniques. And, the growth stage(s), as determined by the individuals, for the various crops may then be aggregated to provide data, which may be analyzed to determine, plot or estimate growth progression of the crops in the region.

Separately, images of fields are known to be captured in various manners, including, for example, by satellites, unmanned and manned aerial vehicles, etc. In connection therewith, the images are further known to be analyzed to determine, for example, yields of crops in the fields.

SUMMARY

This section provides a general summary of the disclosure, and is not a comprehensive disclosure of its full scope or all of its features.

Example embodiments of the present disclosure generally relate to methods for processing image data associated with one or more plots. In one example embodiment, such a method generally includes: accessing, by a computing device, a data set included in a data structure, the data set including (i) multiple images, (ii) a mask for each of the multiple images, and (iii) classification data for each of the multiple images, wherein each of the multiple images is representative of a plot, wherein each of the masks corresponds to one of the multiple images and is indicative of non-crop attributes of the plot represented by the one of the multiple images, and wherein the classification data is indicative of a type of crop included in the plot represented by the one of the multiple images; inputting, by the computing device, each of the multiple images to model architecture of the computing device; for each of the multiple images input to the model architecture: (a) generating, by an encoder of the model architecture of the computing device, a latent image from the input image; (b) generating, by a decoder of the model architecture of the computing device, an output mask, from the latent image; (c) determining, by a classifier of the model architecture of the computing device, an output classification for the crop based on the latent image, the output classification indicative of a type of the crop included in the plot represented by the input image; (d) comparing the output mask generated by the decoder to the mask in the data set corresponding to the input image; (e) comparing the output classification of the input image from the classifier to the classification data for the input image in the data set; and (f) modifying, by the computing device, at least one parameter of the model architecture based on the comparisons; and then storing, by the computing device, the at least one parameter of the model architecture in a memory, whereby the model architecture is suited to generating masks, to distinguish between the crop and the non-crop attributes, for at least one subsequent production image of at least one production plot.

Example embodiments of the present disclosure also relate to non-transitory computer-readable storage media including executable instructions for processing image data. In one example embodiment, such a non-transitory computer-readable storage medium includes executable instructions, which when executed by at least one processor, cause the at least one processor to: access a data set included in a data structure, where the data set includes (i) multiple images, (ii) a mask for each of the multiple images, and (iii) classification data for each of the multiple images, wherein each of the multiple images is representative of a plot, wherein each of the masks corresponds to one of the multiple images and is indicative of non-crop attributes of the plot represented by the one of the multiple images, and wherein the classification data is indicative of a type of crop included in the plot represented by the one of the multiple images; input each of the multiple images to a model architecture; for each of the multiple images input to the classifier: (a) generate, via an encoder of the model architecture, a latent image from the input image; (b) generate, via a decoder of the model architecture, an output mask, from the latent image; (c) determine, via the classifier, an output classification for the crop based on the latent image, the output classification indicative of a type of the crop included in the plot represented by the input image; (d) compare the output mask generated via the decoder to the mask in the data set corresponding to the input image; (e) compare the output classification of the input image from the classifier to the classification data for the input image in the data set; and (f) modify at least one parameter of the model architecture based on the comparisons; and then store the at least one parameter of the model architecture in a memory, whereby the model architecture is suited to generating masks for at least one subsequent production image of a plot.

Example embodiments of the present disclosure also relate to systems for use in processing image data associated with one or more plots. In one example embodiment, such a system generally includes a memory including a model architecture, the model architecture including a classifier, an encoder, and a decoder; and a computing device in communication with the memory. The computing device configured to: access a data set included in a data structure, the data set including (i) multiple images, (ii) a mask for each of the multiple images, and (iii) classification data for each of the multiple images, wherein each of the multiple images is representative of a plot, wherein each of the masks corresponds to one of the multiple images and is indicative of non-crop attributes of the plot represented by the one of the multiple images, and wherein the classification data is indicative of a type of crop included in the plot represented by the one of the multiple images; input each of the multiple images to the classifier of the model architecture; for each of the multiple images input to the classifier: (a) generate, via the encoder of the model architecture, a latent image from the input image; (b) generate, via the decoder of the model architecture, an output mask, from the latent image; (c) determine, via the classifier, an output classification for the crop based on the latent image, the output classification indicative of a type of the crop included in the plot represented by the input image; (d) compare the output mask generated by the decoder to the mask in the data set corresponding to the input image; (e) compare the output classification of the input image from the classifier to the classification data for the input image in the data set; and (f) modify at least one parameter of the model architecture based on the comparisons; and store the at least one parameter of the model architecture in the memory, whereby the model architecture is suited to generate masks for at least one subsequent production image of a plot.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments, are not all possible implementations, and are not intended to limit the scope of the present disclosure.

Figure 1:
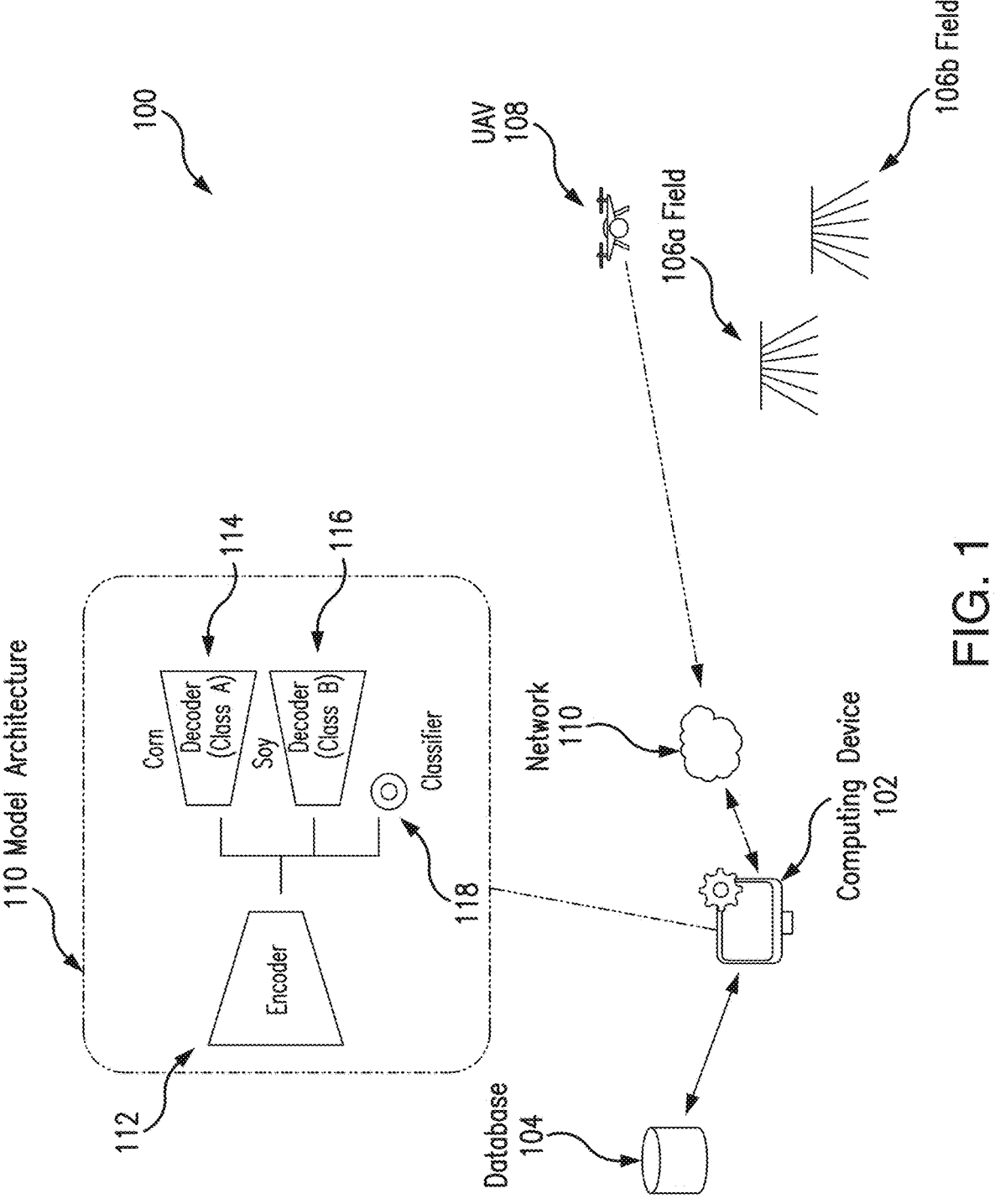
FIG. 1 illustrates an example system of the present disclosure configured for training a model architecture to generate masks for images of crops, from crop specific decoders included in the model architecture.
Figure 5:
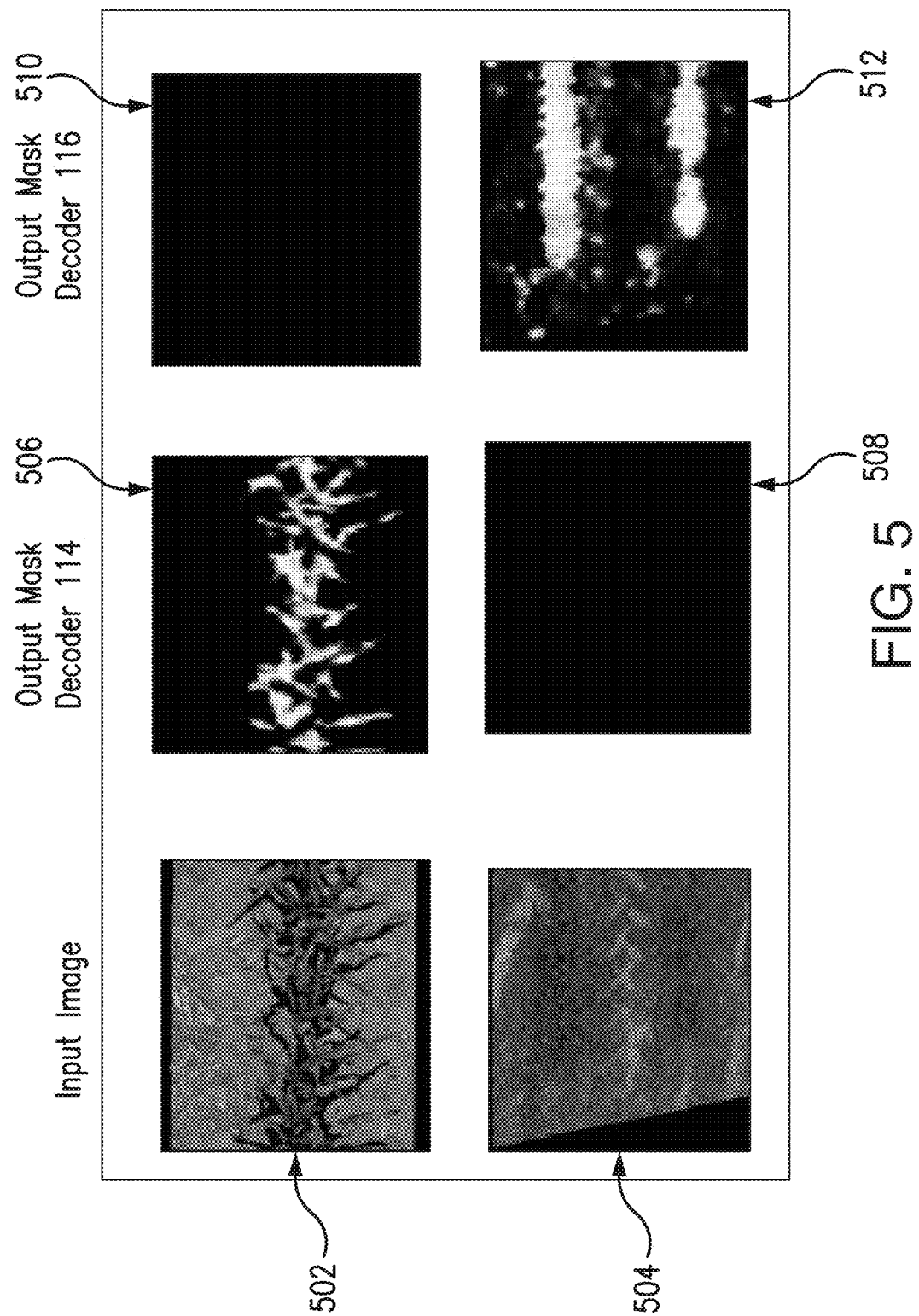
Figures 6A, 6B:
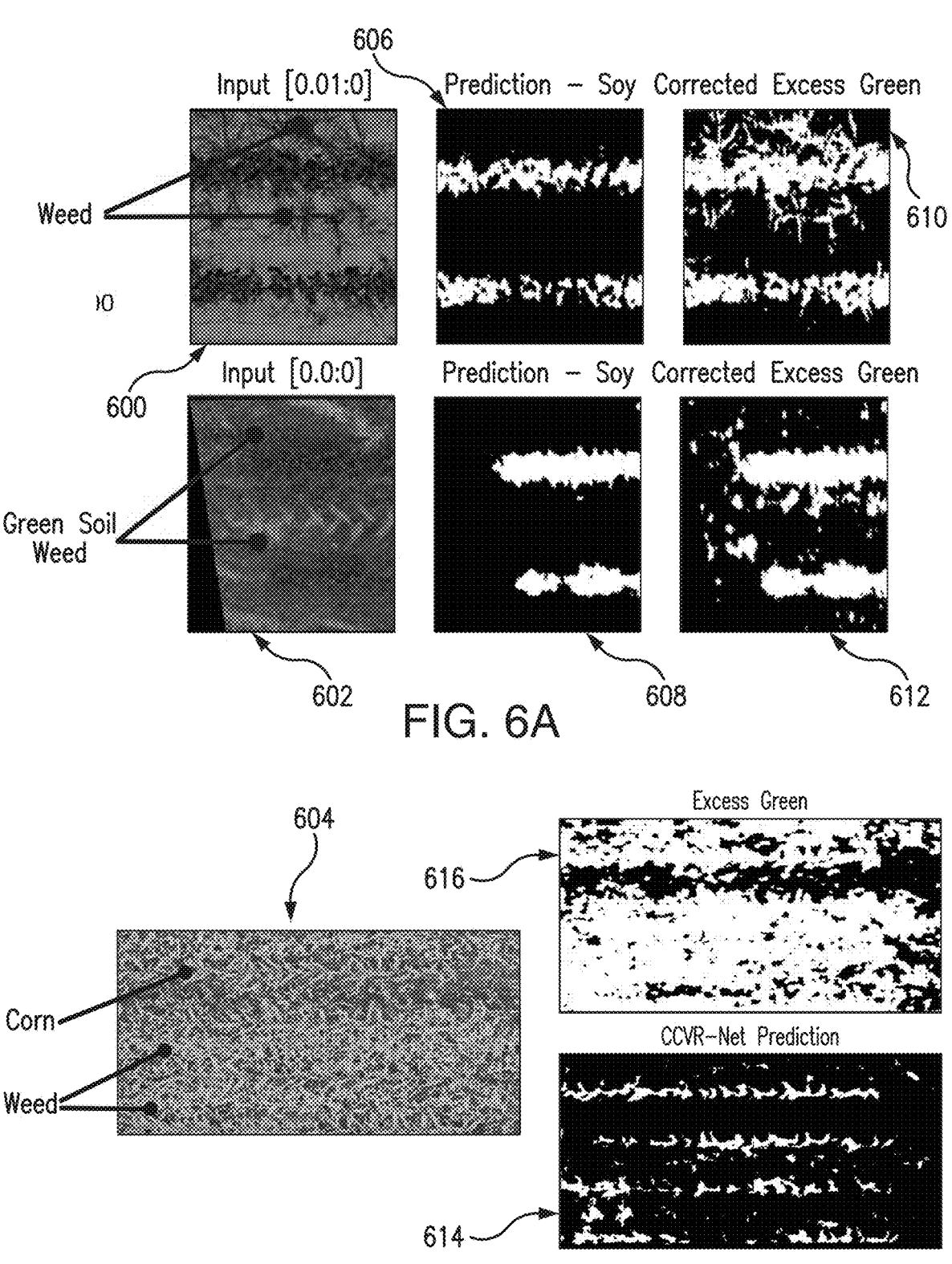

FIG. 5 illustrates example input images of plots having corn and soy crops, and example output masks for the images from the model architecture included in FIG. 1, during training of the model architecture; and FIGS. 6A-6B illustrate example input images of crops together with example output masks for the input images from the system of FIG. 1, as compared to conventionally generated masks for the same example input images.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

As crops grow in different fields (or plots), maturities of the crops advance until harvest, when the crops are then removed from the fields. The harvest, and other milestones for the crops (e.g., where the milestones may include reaching particular growth stages, reaching particular times for treatment applications (e.g., pesticides, insecticides, herbicides, etc.), etc.), are generally dependent on the phenotypic traits, classifications, characteristics, etc. (all broadly, phenotypic data) associated with the crops. Phenotypic data for crops collected by manual intervention is often accurate but is slow and cumbersome to obtain, while analysis of images of the crops may provide more rapid results, but may provide a less accurate indication of the phenotypic data. For example, in connection with image analysis of crops in certain plots, the crops may coexist with weeds, mold, certain ground conditions that obscure the crops, or other undesirable attributes of the plots, that impact an accurate understanding of the crops relative to non-crop attributes in the images. As such, when phenotypic data is determined from such images, the phenotypic data may be inaccurate because it relies on (and/or is obscured by) the non-crop attributes. To that end, masks have been used to remove non-crop attributes from images. However, when the non-crop attributes in the images include green attributes (e.g., generally green colored features such as weeds, mold, etc.), for example, or attributes that are otherwise consistent with the crops, the masks may be inaccurate and/or heavily dependent on human intervention/correction, whereby, at least for large data segments, the phenotypic data continues to be based, at least in part, on manual human intervention and non-crop attributes of the images.

Uniquely, the systems and methods herein leverage the specific crops included in the images in training models to generate masks for the specific crops. In particular, a training data set, upon which a mask generator model is trained, includes input images, output masks (e.g., suited to the specific crops, etc.), and classifier data (e.g., indicative of the crops in the input images, etc.), etc. The input images are in turn encoded into latent image data (e.g., through convolution, etc.), and the latent image data is passed to a decoder for each of the crops for which the model is to be trained (e.g., two decoders for corn and soy, etc.) and to a classifier. The decoder(s) and the classifier are then trained in combination, through a performance metric (e.g., loss function, etc.), where the mask generation for the images is specific to the crops included in the images. And, the masks may then be employed as a basis to eliminate and/or discriminate against non-crop attributes (e.g., weeds, debris, etc.) in order to calculate, generate and/or determine more accurate phenotypic data (e.g., yield, gap detection, canopy coverage, stand count, etc.), etc. for the crops represented in the images. What's more, the masks may be employed as a basis to identify and/or locate (e.g., map, etc.) crops and/or non-crop attributes within the images (e.g., within a same or different field or plot, etc.).

FIG. 1 illustrates an example system 100 in which one or more aspects of the present disclosure may be implemented. Although the system 100 is presented in one arrangement, other embodiments may include the parts of the system 100 (or additional parts) arranged otherwise depending on, for example, sources and/or types of image data, arrangement of fields, types of capture devices used to capture images of crops in fields, types of crops in the fields, etc.

In the example embodiment of FIG. 1, the system 100 generally includes a computing device 102 and a database 104, which is coupled to (and/or otherwise in communication with) the computing device 102, as indicated by the arrowed line. The computing device 102 is illustrated as separate from the database 104 in FIG. 1, but it should be appreciated that the database 104 may be included, in whole or in part, in the computing device 102 in other system embodiments.

The system 100 also includes multiple fields 106a-b. The fields 106a-b, in general, are provided for planting, growing and harvesting crops, etc., in connection with farming, for example. While only two fields 106a-b are shown in the system 100, it should be appreciated that another number of fields may be included in other embodiments, including, for example, dozens, hundreds or thousands of fields, covering several acres (e.g., 1 acre, 10 acres, 50 acres, 100 acres, 200 acres, 1000 acres, or more or less, etc.). It should also be understood that fields may be used herein to refer to any growing spaces, in general, which is exposed for aerial imaging regardless of size, etc.

The fields 106a-b may also define one or more plots (e.g., geographically, etc.), which may be any suitable size (e.g., two meters by 30 meters, etc.). In connection therewith, the plot sizes may be specific to crops, tests, experiments, regions, etc. Often, the fields 106a-b each include multiple plots. What's more, the fields 106a-b may include different crops, but the plots defined within the field will include only one crop. For example, the field 106a may include three different corn hybrids, where the area in which each of the hybrids is planted defines a different plot within the field 106a. That said, each of the fields 106a-b generally includes more than one plot. For example, the field 106a may include ten or more plots, while the field 106b may include five or more plots, etc. Stated another way, a plot is generally a smaller area of land, as compared to a field (although this is not required in all implementations of the present disclosure, for example, as in some implementations a plot may include an entire field or multiple fields, etc.). As an example (and without limitation), a plot included in a field may have a size ranging from about 0.5 meters to about 5 meters in width and/or a size ranging from about 1 meter to about 10 meters in length. Plots may have different sizes in other embodiments, for example, widths that are less than about 0.5 meters, widths that are greater than about 5 meters, lengths that are less than about 1 meter, lengths that are greater than about 10 meters, etc. To that end, in the example system 100, images herein associated with the fields 106a-b are generally specific to one plot, which, in turn, includes only one crop.

The crops (or plants) planted in the fields 106a-b may include, for example (and without limitation), corn (or maize), wheat, beans (e.g., soybeans, etc.), peppers, tomatoes, tobacco, eggplant, corn or maize, rice, rye, sorghum, sunflower, potatoes, cotton, sweet potato, coffee, coconut, pineapple, citrus trees, prunes, cocoa, banana, avocado, fig, guava, mango, olive, *papaya*, cashew, almond, sugar beets, sugarcane, oats, barley, vegetables, or other suitable crops or products or combinations thereof, etc. In addition, the fields 106a-c may each include the same type of plants/crops, or a number of different varieties of the same type of plants (or crops), or different types of plants/crops. For example, field 106a may include a first hybrid maize plant, while field 106b may include a second, different hybrid maize plant. Alternatively, the field 106a may include a third, different hybrid maize plant, while the field 106b may include a first hybrid soybean plant, etc. It should be appreciated that the fields 106a-b (and other fields in the system 100) may be located in proximity to one another, or not. And, the crops are generally planted in the fields 106a-b at or about the same time, per plot, and then grow in the plot over a growing phase until harvested, by the farmer or grower.

From time to time, during the growing phase of crops in the fields 106a-b, for example, images of the fields 106a-b, and the specific plots therein, are captured by one or more different image capture devices, including image capture device 108, throughout a growing season. In the illustrated embodiment, the image capture device 108 includes an unmanned aerial vehicle (UAV) (e.g., UAV 108, etc.). While only one image capture device 108 is illustrated in FIG. 1, for purposes of simplicity, it should be appreciated that the system 100 may include (and in several implementations will include) multiple such image capture devices. What's more, the image capture device 108 is not limited to the UAV, whereby the system 100 may include one or more additional alternate image capture devices (e.g., satellites, manned aerial vehicles (MAVs), etc.). In one embodiment, the system 100 may include at least one satellite (as an image captured device), and then may also include (or may also be configured to implement) the image processing techniques described in Applicant's U.S. patent application Ser. No. 17/956,119, filed Sep. 29, 2022, which is incorporated herein by reference, for generating images for use as described herein.

In the illustrated system 100, the UAV 108 is configured to navigate to one or more fields, including the fields 106a-b, and to capture images to the fields 106a-b (including plots in the fields 106a-b). The UAV 108 is further configured to transmit the images to the database 104, for example, via network 120 (either directly or via computing device 102), and the database 104 is configured to receive and store the images.

An image from the UAV 108 may be referred to herein as a UAV image, where the spatial resolution may be, for example, without limitation, less than about 1 inch, or about 35 millimeters, per pixel, or more or less depending on the particular UAV 108, etc. More generally herein, the spatial resolution of the images may be about one foot by about one foot or less per pixel (e.g., six inches by about six inches per pixel, about one inch by about one inch per pixel, about 0.4 inches by about 0.4 inches per pixel, etc.). The temporal resolution for the UAV images may be one per year, twice per year, one per month, etc., depending on the operation of the UAV 108, the frequency of the UAV coverage of the fields 106a-b, etc. More generally herein, the temporal resolution may be based on (or may take into account) bio-events (e.g., growth events or growth stages, emergence of certain phenotypic traits, etc.) associated with a crop captured in the images (e.g., a crop included in the plot associated with the images, etc.). The temporal resolution for the images may also take into account climate (e.g., thermal time, etc.), as the climate may affect the bio-events. In doing so, images may be captured based on at particular growth events of the crop, for example, planting, emergence, flowering, onset of maturity, etc.

Also in the system 100, the UAV 108 is configured generally as a multi-spectral sensor, whereby the UAV is configured to collect (e.g., in connection with obtaining images of the fields, plots, crops, etc.) radiometric reflection data in red (R), green (G), blue (B), and near infrared (NIR) regions of the electromagnetic spectrum (broadly, spectral data). That said, it should be appreciated that more or less image data may be captured in other system embodiments.

Figure 2:
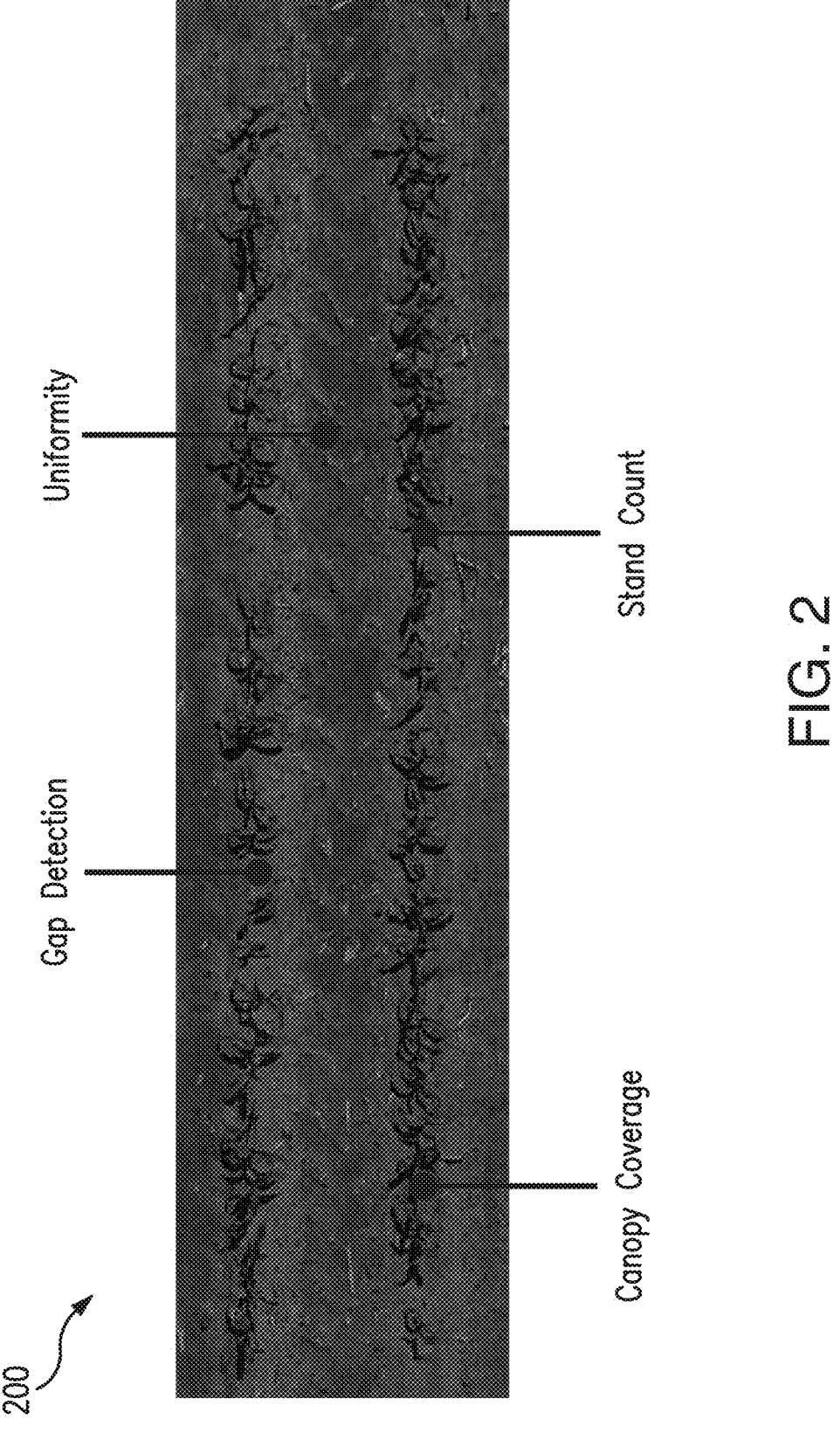
FIG. 2 is an example image of a plot that includes a corn crop, and for which a mask may be generated by way of the system of FIG. 1.

The images captured by the UAV 108 (and by other image capture devices in other embodiments of the system 100) include, generally, both the crops in the plot (or fields 106a-b), and also non-crop attributes in the plot (or fields 106a-b). The non-crop attributes may include, for example, soil, soil conditions (e.g., mold, etc.), weeds (e.g., other plants around the crops, etc.), debris, standing water (e.g., ponding, pooling, etc.), moisture, etc. FIG. 2, for example, illustrates an example image 200 of a plot, or part thereof, that may be captured by the UAV 108. The image illustrates a crop in the plot, along with soil in different colors, shadows caused by the crops, and weeds disposed between and/or around the crops, etc. In connection therewith, the components of the image may be segmented or distinguished, for example, into crop attributes (e.g., the particular crop in the image, canopy cover of the crop, stand count for the crop, gaps between plants, uniformity of rows of plants, etc.) and non-crop attributes (e.g., dirt, weed, debris, etc. in the illustrated image).

As indicated above, after the images of the fields 106*a-b* are captured by the UAV 108, the images are stored in the database 104. In connection therewith, the database 104 includes various data sets of images, which include numerous images of various fields, including the fields 106*a-b*, etc. (e.g., UAV images captured by the UAV 108, etc.). The images in the data sets may also include the radiometric reflection data captured by the UAV 108 for the fields (and/or the plots and/or the crops in the fields). The data set, including the UAV images and radiometric data, may include location data (e.g., GPS data as associated with and/or assigned by the UAV 108 in connection with capturing the images, etc.) and may be organized by location(s) of the images and/or by date/time of capture of the image(s), etc., as is suitable for the use as described herein. It should be appreciated that the image data may include more or less data depending on, for example, the particular image capture device used in capturing the specific images, etc., or potentially, processing of the images to reduce or enhance the data included in the image, etc. Further, in some example embodiments, the captured images may be cropped (e.g., processed, pre-processed, etc.) so as to include a particular plot (e.g., the images may be cropped so that only one plot is shown, etc.), or the images may be cropped so as to include a particular portion of a plot, or multiple specific plots. In doing so, the cropped images may then also be stored in the database 104 (e.g., as part of the original data set including the images, as a new data set including the cropped images, etc.).

In addition, the database 104 also includes multiple masks, each associated with an image (of one or more of the data sets) in the database 104. Each mask is specific to the image and includes either a "1" or a "0" for each pixel in the image, where 0 indicates to mask the underlying pixel in the image. The masks, and the images associated with the masks, form a training data set for use as described herein. In this example embodiment, the masks included in the database 104, for the training data set, are generated through one or more techniques such as, for example, application of the Excess Green (ExG) Index, etc. In connection with such techniques, each of the resulting masks is often threshold dependent, whereby the threshold of the excess green index defining the mask is modified, per image, for example, to achieve a more accurate mask. Apart from such mask generation, and threshold tuning per image/mask, additional processing (e.g. by human intervention to define the mask, or by other suitable machine techniques, etc.) may be employed for the masks in the training data set to provide accurate masks for the associated images.

Further, the images in the training data set, in the database 104, include images specific to plots having particular crops for which the model is to be trained. For example, where the model is to be trained to generate masks for corn and soy crops, the images in the training data set will includes images of corn plots and also images of soy plots. Other combinations of images of different crops (and plots) may be employed depending on the model to be trained with the training data set, etc. What's more, such training is not limited to pairs of crops and may be employed for any desired number of crops (e.g., three crops, four crops, five crops, etc.).

Moreover, the database 104 includes classifier data for the images in the training data set. As explained above, the fields 106*a-b*, for example, are planted with one or more different crops. In one example, the field 106*a* is planted with a variety of corn, while the field 106*b* is planted with a variety of soybeans. Generally, the type of crop planted in the field 106*a* is consistent for each separate plot within the field (e.g., one crop per plot, etc.). The associated classifier data then indicates the specific type or variety of crop that is planted in each given plot within the fields 106*a-b*.

In connection with the above, the computing device 102 of the system 100 is configured to generate one or more masks for the images of a given plot (e.g., based on the training data set, etc.) to thereby provide segmentation between crop attributes (broadly, dimensions) in the images (e.g., the crops, etc.) and non-crop attributes (broadly, dimensions) in the images (e.g., to mask non-crop attributes of the images, etc.). In this way, the crop attributes (e.g., the crops, etc.) may be distinguished from the non-crop attributes (e.g., weeds, etc.). In addition, a relative position of the masks (e.g., in the field, etc.) may be used to locate (e.g., map, etc.) the crop attributes (e.g., the crops, etc.) apart from non-crop attributes (e.g., the weeds, etc.) in the field, or locate (e.g., map, etc.) the non-crop attributes apart from crop attributes (e.g., based on the image, the mask, or other interpretation of the image (e.g., a greenness-based mask, etc.), etc.)). For instance, once the mask(s) is/are generated (and, potentially, identified as accurate), location data associated with the images (e.g., GPS data, etc.) may be used to determine or identify a relative position/location of the crop attributes and/or non-crop attributes with respect to the ground/field (e.g., taking into account greenness data, or not, for the underlying images, etc.).

In particular, as shown in FIG. 1, the computing device 102 includes (or is configured with) a model architecture (or framework) 110, which includes an encoder 112, a first decoder 114 specific to a first type of crop (e.g., corn in this example, etc.), a second decoder 116 specific to a second, different type of crop (e.g., soy in this example, etc.), and a classifier 118. It should be appreciated that the model architecture 110 may be arranged otherwise in other embodiments (e.g., the architecture 110 may include additional decoders for different crops, etc.), depending on, for example, a number of different crops for which the network is to generate masks, etc. Specifically, for example, where the model architecture 110 is configured to handle and/or accommodate images of plots having four different crops, the model architecture 110 then may include four decoders (one per (or specific to) each different crop) and a classifier for the four different crops. That said, in some embodiments, the model architecture 110 may define a convolution neural network (CNN).

The computing device 102 is configured then, by the model architecture 110, to generate a mask output based on an image input. In connection therewith, initially, the model architecture 110 is trained based on the images included in the training data set. The training of the model architecture 110 includes providing each of multiple images from the training data set as an input image (e.g., a UAV image from the training data set, etc.) to the encoder 112. The encoder 112, in turn, is configured to encode the input image, whereby the image is incrementally scaled down through various layers. The encoder 112 may include, for example, four increments or layers, where the encoder 112 is configured to scale the image down by ½ times in each of the four layers (e.g., as achieved in semantic segmentation model (e.g., via DeepLab model, etc.) via convolutions with strides equal to two, etc.). As such, in this example, the image may be scaled to ½ size in the first increment, to ¼ size in the second increment, to ⅛ size in the third increment, and to 1/16 size in the fourth, final increment, etc.). It should be appreciated that the particular ratios associated with the encoding, as well as the number of increments/layers may be different in other embodiments (e.g., the encoding may instead be achieved via dilated convolution, via one-step or usual convolution, etc.). That said, the final scaled down image is referred to herein as a latent image (e.g., between the encoder 112 and the decoders 114, 116) (e.g., where each of the multiple images in the training data set is encoded or scaled to a latent image, etc.).

Next, the model architecture 110 is configured to pass each of the latent images from the encoder 112 to an input of each of the decoders 114, 116 and also to an input of the classifier 118. Each of the decoders 114, 116 is configured to scale up the latent image from the encoder 112 to generate a mask output. In particular, in the system 100, the decoder 114 is configured to decode each of the latent images into an output mask where the original input image included a corn crop; and the decoder 116 is configured to decode each of the latent images into an output mask where the original image included a soy crop. Like with the encoder 112, the decoders 114, 116 are configured to scale up the latent images over multiple increments. In this example embodiment, the decoders 114, 116 are each configured to upscale the latent images in two increments (or layers), where the latent images are scaled up four times in each increment (or layer). As such, in the above example, where the scaled down latent image from the encoder 112 is at a 1/16 size, the decoders 114, 116 may each be configured to upscale the image to ¼ in the first increment and then to one (or the original size of the image) in the second increment. As above, it should be appreciated that the particular ratios associated with upscaling the latent images, as well as the number of increment or layers implemented or utilized, may be different in other embodiments.

Apart from the decoders 114, 116, the classifier 118 of the model architecture 110 is configured to classify each of the latent images as being either a corn crop or a soy crop (broadly, a dimension of the images). Then, in connection with the training of the model architecture 110, the output of the classifier 118 and the output masks from the decoders 114, 116 are compared to the corresponding mask and classifier data, from the training data set, for the input image. The computing device 102 is configured to further employ a loss function based on the comparison, as indicated/defined by Equation (1) below.

$$L(\text{loss}) = L_{class} + L_{mask(corn)} + L_{mask(soy)} \quad (1)$$

In connection therewith, each of the loss features ($L_{class}$, $L_{mask(corn)}$, and $L_{mask(soy)}$) of Equation (1) generally represent a binary cross-entropy loss by themselves. The mask loss features, then, generally include a mean value for pixel level cross-entropy, and the classification loss feature generally includes a value for class level cross-entropy. And, cross-entropy loss is between true probability p and predicted probability q distributions. That said, in this example embodiment, the computing device 102 is configured to calculate each of the loss features by way of the binary cross entropy (H(q))/log loss function of Equation (2). Here, y is the label (e.g., 1 for corn and 0 for soy for the $L_{mask(soy)}$, etc.), p(y) is the true probability (e.g., 1 for corn, etc.) for N data points, and q is the predicted probability.

$$H_p(q) = -\frac{1}{N}\sum_{i=1}^{N} y_i \cdot \log(p(y_i)) + (1 - y_i) \cdot \log(1 - p(y_i)) \quad (2)$$

In turn, the computing device 102 is configured to employ values from the loss function as a feedback into the model architecture 110, and specifically, to the decoders 114, 116 and the classifier 118, and to modify certain parameters (e.g., weights associated with (or applied to) the decoder 114, weights associated with (or applied to) the decoder 116, and/or weights associated with (or applied to) the classifier 118, etc.; settings, values or other features associated with one or more of the decoder 114, the decoder 116, and/or the classifier 118, or architecture 110 in general, etc.; etc.) included in the model architecture 110. In this manner, the computing device 102 is configured to train the model architecture 110, through the multiple dimensions of the training data set, as processed by the decoders 114, 116 and the classifier 118. As such, the decoders 114, 116 are trained to distinguish crops of a particular type, whereby the model architecture 110 performs as a mask generator and a classifier to ensure corn-type masks are generated for corn images, and soy-type mask are generated by soy images, etc. To that end, the encoder 112, the decoders 114, 116, and/or the classifier 118 may be associated with one or more weights and values that can be determined and/or manipulated, for example, as appropriate to function as described herein (as would generally be apparent to one skilled in the art in view of the present disclosure).

The training is continued, whereby weight settings, values or other features of the decoders and/or classifier are modified, until the training set is exhausted and/or an acceptable result of the loss function is achieved over various images in the training set. In connection therewith, the trained model may be validated based on, for example, additional data consistent with the training data. The validation may be performed as part of the above training, or may be a part of one or more iterations of the training, as described below, where improvement of the model may be observed between iterations, etc.

Then, once the model architecture 110 is trained, the computing device 102 is configured, by the model architecture 110, to generate masks for input images in other data sets, such as, for example, production images (e.g., where no other mask or crop type is known, etc.) associated with production fields, etc. (which may include different fields than used for training or which may include the same fields). In doing so, the computing device 102 is configured to then apply the generated masks to the respective production images and, for example, to determine phenotypic data (e.g., gap detection, canopy coverage, stand counts, etc.) for a plot(s) included in the production images, etc. Additionally, or alternatively, the generated masks may be stored in or stored as part of a further training set, and the computing device 102 may be configured to incrementally train the model architecture 110 based on the further training data set, and repeat as needed and/or as suitable for accuracy, performance, etc. In addition, in some examples, location data associated with the production images (e.g., GPS data, etc.) may be used to determine or identify a relative position/location of the crop attributes and/or non-crop attributes with respect to the ground/field (e.g., taking into account greenness data, or not, for the underlying images, etc.). And, a relative position of the masks generated for the production images (e.g., in the production fields, etc.) may be used to locate (e.g., map, etc.) the crop attributes (e.g., the crops, etc.) apart from non-crop attributes (e.g., the weeds, etc.) in the production field or locate (e.g., map, etc.) the non-crop attributes apart from crop attributes (e.g., based on the image, the mask, or other interpretation of the image (e.g., a greenness-based mask, etc.), etc.)).

Further, the computing device 102 may be configured, in one or more embodiments, to incrementally train the model architecture 110. In particular, for example, a set of masks may be generated by the model architecture 110, as trained above, and validated (e.g., as consistent with a training set of masks, etc.), whereby a second iteration training set is defined. The second training set (or second iteration training set) may then include the original images, the generated masks, and also classifier data for the images (e.g., as defined by the model architecture 110, or defined otherwise, etc.).

It should be appreciated that, in one or more embodiments, in a first iteration or a later iteration, the computing device 102 may be configured to filter the second training set based on a level of noise in the images. For example, training may be determined, by one or more metrics, to be more or less successful based on characteristics of the training set, whereby a high concentration of plants or weeds, or generally, crop or non-crop attributes, etc., may result in a more or less accurate training of the model architecture 110. As such, as described herein, the computing device 102 may filter a training set, in some embodiments (e.g., in a first, second or third iteration, etc.) to define a training set with a desired characteristic(s) to improve overall performance of the trained model architecture. The filtering, in one example, may be based on the greenness of the image (e.g., as understood from normalized difference vegetation index (NDVI) or a derivation thereof, etc.), as compared to the mask for the image, as explained more below.

Figure 3:
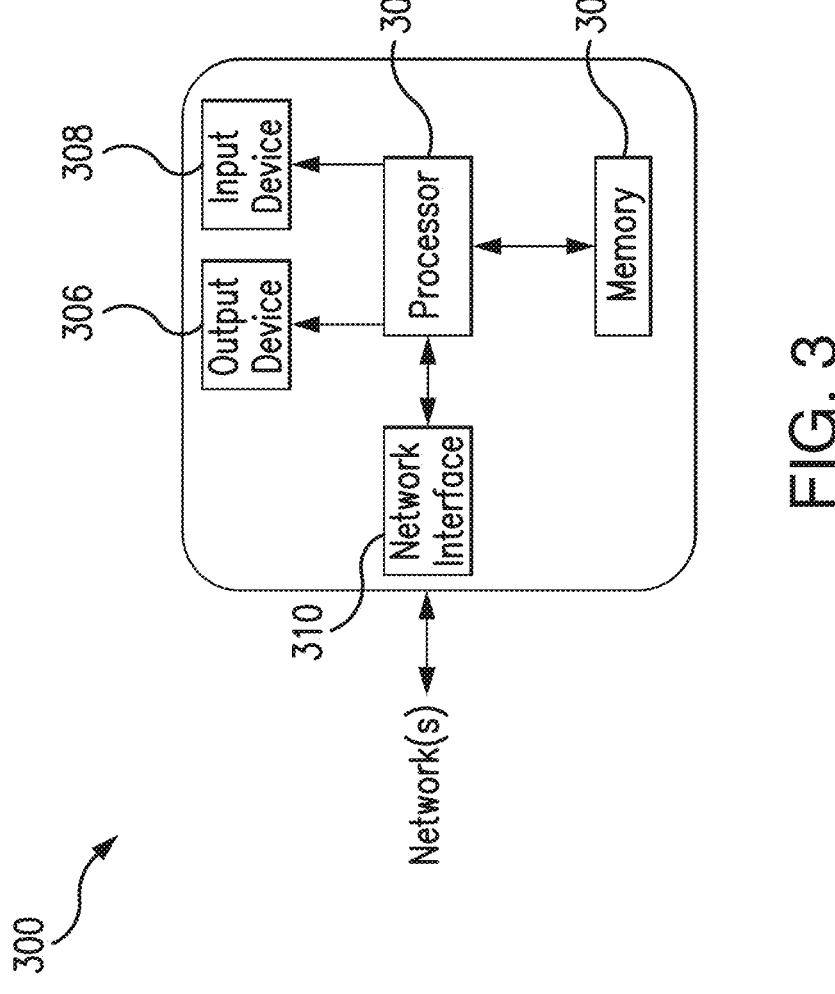
FIG. 3 is a block diagram of an example computing device that may be used in the system of FIG. 1.

FIG. 3 illustrates an example computing device 300 that may be used in the system 100 of FIG. 1. The computing device 300 may include, for example, one or more servers, workstations, personal computers, laptops, tablets, smartphones, virtual devices, etc. In addition, the computing device 300 may include a single computing device, or it may include multiple computing devices located in close proximity or distributed over a geographic region, so long as the computing devices are specifically configured to operate as described herein.

In the example embodiment of FIG. 1, the computing device 102 includes and/or is implemented in one or more computing devices consistent with computing device 300. The database 104 may also be understood to include and/or be implemented in one or more computing devices, at least partially consistent with the computing device 300. However, the system 100 should not be considered to be limited to the computing device 300, as described below, as different computing devices and/or arrangements of computing devices may be used. In addition, different components and/or arrangements of components may be used in other computing devices.

As shown in FIG. 3, the example computing device 300 includes a processor 302 and a memory 304 coupled to (and in communication with) the processor 302. The processor 302 may include one or more processing units (e.g., in a multi-core configuration, etc.). For example, the processor 302 may include, without limitation, a central processing unit (CPU), a microcontroller, a reduced instruction set computer (RISC) processor, a graphics processing unit (GPU), an application specific integrated circuit (ASIC), a programmable logic device (PLD), a gate array, and/or any other circuit or processor capable of the functions described herein.

The memory 304, as described herein, is one or more devices that permit data, instructions, etc., to be stored therein and retrieved therefrom. In connection therewith, the memory 304 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media for storing such data, instructions, etc. In particular herein, the memory 304 is configured to store data including, without limitation, images (e.g., UAV images, etc.), masks, model architectures (trained and un-trained), parameters, classifier data, phenotypic data, and/or other types of data (and/or data structures) suitable for use as described herein.

Furthermore, in various embodiments, computer-executable instructions may be stored in the memory 304 for execution by the processor 302 to cause the processor 302 to perform one or more of the operations described herein (e.g., one or more of the operations of method 400, etc.) in connection with the various different parts of the system 100, such that the memory 304 is a physical, tangible, and non-transitory computer readable storage media. Such instructions often improve the efficiencies and/or performance of the processor 302 that is performing one or more of the various operations herein, whereby such performance may transform the computing device 300 into a special-purpose computing device. It should be appreciated that the memory 304 may include a variety of different memories, each implemented in connection with one or more of the functions or processes described herein.

In the example embodiment, the computing device 300 also includes a output device 306 that is coupled to (and is in communication with) the processor 302 (e.g., a presentation unit, etc.). The output device 306 may output information (e.g., masks, phenotypic data, etc.), visually or otherwise, to a user of the computing device 300, such as a researcher, grower, etc. It should be further appreciated that various interfaces (e.g., as defined by network-based applications, websites, etc.) may be displayed or otherwise output at computing device 300, and in particular at output device 306, to display, present, etc. certain information to the user. The output device 306 may include, without limitation, a liquid crystal display (LCD), a light-emitting diode (LED) display, an organic LED (OLED) display, an "electronic ink" display, speakers, a printer, etc. In some embodiments, the output device 306 may include multiple devices. Additionally or alternatively, the output device 306 may include printing capability, enabling the computing device 300 to print text, images, and the like on paper and/or other similar media.

In addition, the computing device 300 includes an input device 308 that receives inputs from the user (i.e., user inputs) such as, for example, selections of crops, plots, images, desired characteristics, etc. The input device 308 may include a single input device or multiple input devices. The input device 308 is coupled to (and is in communication with) the processor 302 and may include, for example, one or more of a keyboard, a pointing device, a touch sensitive panel, or other suitable user input devices. It should be appreciated that in at least one embodiment the input device 308 may be integrated and/or included with the output device 306 (e.g., a touchscreen display, etc.).

Further, the illustrated computing device 300 also includes a network interface 310 coupled to (and in communication with) the processor 302 and the memory 304. The network interface 310 may include, without limitation, a wired network adapter, a wireless network adapter, a mobile network adapter, or other device capable of communicating to one or more different networks (e.g., one or more of a local area network (LAN), a wide area network (WAN) (e.g., the Internet, etc.), a mobile network, a virtual network, and/or another suitable public and/or private network, etc.), including the network 120 or other suitable network capable of supporting wired and/or wireless communication between the computing device 300 and other computing devices, including with other computing devices used as described herein (e.g., between the computing device 102, the database 104, etc.).

Figure 4:
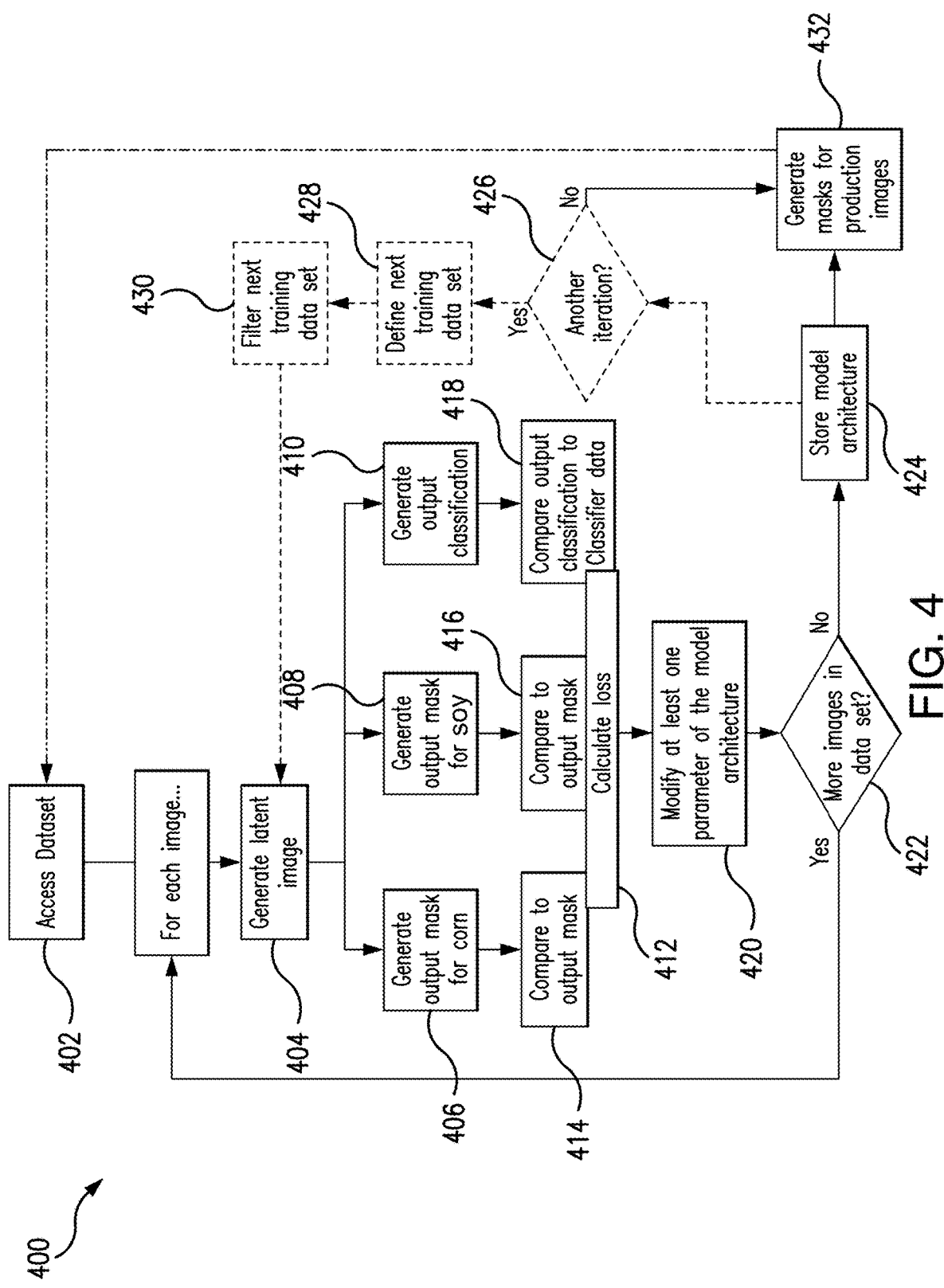
FIG. 4 illustrates a flow diagram of an example method, which may be used in (or implemented in) the system of FIG. 1, for use in training a model architecture for generating masks for (or associated with) images of crops based on one or more crop specific decoders.

FIG. 4 illustrates an example method 400 for training a model architecture to generate masks for images provided to the model architecture, based on types of crops included in the images. The example method 400 is described herein in connection with the system 100, and may be implemented, in whole or in part, in the computing device 102 of the system 100. Further, for purposes of illustration, the example method 400 is also described with reference to the computing device 300 of FIG. 3. However, it should be appreciated that the method 400, or other methods described herein, are not limited to the system 100 or the computing device 300. And, conversely, the systems, data structures, and the computing devices described herein are not limited to the example method 400.

At the outset, it should be appreciated that the database 104 includes a training data set, which includes multiple images of a plot (or of various plots) (and crops planted in or included in the various plots) (e.g., for images of plots as captured by the UAV 108, etc.), multiple masks associated with the images, and classifier data for the crops included in the plots. As noted above, each of the multiple masks in the database 104 corresponds to one of the images in the training data set in the database 104.

That said, in the method 400, the computing device 102 trains the model architecture 110 through use of the training data set. As such, to start the training (or to continue with prior training, etc.), the computing device 102 accesses, at 402, the training data set (and the images, masks, and classifier data included therein) in the database 104.

Next, for each image in the training data set, the computing device 102 inputs the image to the encoder 112 of the model architecture 110 and generates a latent image, at 404, via the encoder 112. In particular, as indicated above in system 100, the encoder 112 performs a series of incremental reductions of the input image, through multiple layers. For example, the specific reduction may include a ½ times reduction in each of four layers or increments. As such, for an input image of 384×384 pixels, the output image of the first iteration (or first layer) of the encoder 112 may be reduced to a 192×192 pixel image. Subsequent iterations (or layers) of the encoder 114 may be similarly implemented to achieve further reductions of the image to 96×96 pixels (in the second iteration/layer), to 48×48 pixels (in the third iteration/layer), and to 24×24 pixels (in the four iteration/layer), for example.

In this example embodiment, as generally described above, the input image provided by the computing device

102 to the encoder 112 may have a size of about 384×384 pixels, and the latent image from the encoder 112 may then have a size of about 24×24 pixels. That said, other specific input sizes for images, numbers of layers (or iterations) associated with the encoder 112, corresponding reductions for each layer of the encoder 112, etc., may be employed in other method embodiments to define latent images of different sizes, for example, as is suitable to a particular implementation of the model architecture 110, as is suitable to accommodate particular input images, etc.

When the encoder 112 has completed each of the layers (or iterations) associated therewith for the given input image, the corresponding latent image is defined (as above). The latent image is then provided from the encoder 112 to the decoders 114, 116 and the classifier 118 in the model architecture 110. In addition, in some example embodiments, the encoder 112 performs one or more dilated convolutions (e.g., at different rates such as a 1×1 convolution, a 3×3 convolution at a rate of 6, a 3×3 convolution at a rate of 12, a 3×3 convolution at a rate of 18, etc.) on the latent image, for example, in connection with a spatial pyramid pooling layer (see, for example, FIG. A1 in Appendix A), etc., to extract semantic multi-scale context data from the latent image. In such example embodiments, once the dilated convolutions are complete, the latent image is then provided from the encoder 112 to the decoders 114, 116 and the classifier 118.

At 406, then, upon receiving the latent image from the encoder 112, the decoder 114 generates an output mask for corn, in this embodiment, whereby the mask is specific to corn crops. In particular, the decoder 114 operates to upscale the latent image from the encoder 112 into the output mask through a series of increments or layers. Specifically in this example, the decoder 114 upscales the latent images in two increments (or layers), where the latent images are scaled up four times in each increment (or layer). As such, in the above example, where the scaled down latent image from the encoder 112 has a size of about 24×24 pixels, the decoder 114 upscales the latent image (from the encoder 112 (e.g., including spatial pyramid content when applicable, etc.) to a size of about 96×96 pixels in the first increment and concatenate the image with the reduced image from the second layer/increment (e.g., the downscaled image having the size of about 96×96 pixels, etc.). And then, in the second increment, the decoder 114 upscales the concatenated image to a size of about 384×384 pixels (or the original size of the image).

Similarly, at 408, the decoder 116 generates an output mask for soy, in this embodiment, whereby the mask is specific to soy crops. In doing so, the decoder 116 operates to upscale the latent image from the decoder 116 consistent with the description above for the decoder 114. Specifically in this example, the decoder 116 upscales the latent images in two increments (or layers), where the latent images are scaled up four times in each increment (or layer). As such, in the above example, where the scaled down latent image from the encoder 112 has a size of about 24×24 pixels, the decoder 116 upscales the latent image (from the encoder 112 (e.g., including spatial pyramid content when applicable, etc.) to a size of about 96×96 pixels in the first increment and concatenate the image with the reduced image from the second layer/increment (e.g., the downscaled image having the size of about 96×96 pixels, etc.). And then, in the second increment, the decoder 116 upscales the concatenated image to a size of about 384×384 pixels (or the original size of the image).

FIG. 5 illustrates application of masks by the decoders 114, 116 to two example input images 502, 504. The input image 502 includes a plot having a corn crop, and the input image 504 includes a plot having a soy crop. Respective output masks 506-512 generated by the decoders 114, 116 are then also shown. It should be appreciated that the example input images 502, 504 are color images (even though illustrated herein in gray scale), whereby certain information of the color images may then be used as described herein. For instance, as the input images 502, 504 are input to the model architecture 110 during training (or after training), each is encoded into a latent image by the encoder 112. The model architecture 110 then provides the latent images to the decoders 114, 116. In turn, the decoder 114 generates a mask 506 for the latent image associated with the corn input image 502 sufficient to mask non-crop attributes in the image 502, but yet to reveal the corn crop. Conversely, for the latent image associated with the soy input image 504, the same decoder 114 generates a complete mask 508, as an indication that no corn plants were recognized in the input image 504 of the soy crop. Similarly, for the latent image associated with the corn input image 502, the decoder 116 generates a complete mask 510, as an indication that no soy plants were recognized in the input image 504 of the corn crop. And, for the latent image associated with the soy input image 502, the decoder 116 generates a mask 512 sufficient to mask non-crop attributes in the image 502, but yet to reveal the soy crop.

Referring again to FIG. 4, at 410, also at this point in the method 400, the classifier 118 generates an output classification for the given latent image. Specifically, the classifier 118 operates to classify the latent image from the encoder 112 as being either a corn crop or a soy crop. In this example, the training data set includes corn plot images and soy plot images. As such, the output classification, from the classifier 118, indicates either corn or soy, for example, by 1=corn or 0=soy.

Thereafter in the method 400, the computing device 102 assesses the performance of the model architecture 110, by comparison of the output masks and output classification to the training data set, through the loss function (Equation (1)) described above in the system 100. In particular, the computing device 102 calculates, at 412, a loss for the outputs relative to the training data set, through the loss function. And, in doing so, for example, the computing device uses the binary cross entropy/log loss function of Equation (2), as generally described above in the system 100.

In the method 400, in connection with calculating the loss, the computing device 102 compares, at 414, the output mask from the decoder 114 to either: the mask from the training data set for the input image when the input image includes a corn crop or to a complete mask when the input image includes a soy crop. When the input image includes corn, the output mask is expected to match the mask from the training data set, because the decoder 114 is expected to generate a corn mask. Conversely, when the input image includes soy, the decoder 114 is expected to generate an output mask that is complete or, for example, black (as shown for mask 508 in FIG. 5). Similarly, at 416, the computing device 102 compares the output mask from the decoder 116 to either: the mask from the training data set for the input image when the input image includes a soy crop, or a complete mask when the input image includes a corn crop (for example, mask 510 in FIG. 5).

Additionally, at 418, the computing device 102 compares the output classification from the classifier 118 to the classification data from the training data set. As such, the computing device 102 either identifies a match when the crop type is classified correctly by the classifier 118, or a mismatch when the crop type is not classified correctly.

The above comparisons, in this embodiment, are expressed in the loss function, whereby, an understanding of the performance of the model architecture 110 is indicated. Based thereon, the computing device 102 then modifies, at 420, at least one parameter of the model architecture 110. Specifically, each of the encoder 112, decoders 114, 116 and the classifier 118, are subject to a specific weighting (or weights) (e.g., ranging from 0 to 1, etc.). As such, during training, such weighting (or weights) are updated to minimize the loss of Equation (1) (e.g., via deep learning, back propagation, etc.).

Once the at least one parameter is modified, if modified, the computing device 102 determines, at 422, whether any additional images are included in the training data set. If additional images are included in the training data set, the computing device 102 returns to step 404 with a next one of the images as an input image to the encoder 112, and repeats the subsequent steps. If no further images are included in the training data set (e.g., all images in the training data set have been processed, etc.), the computing device 102 determines a performance of the trained model architecture 110 based on the loss function and if the loss function indicates that the performance is acceptable (e.g., based on one or more thresholds, etc.) and stores, at 424, the model architecture 110, as modified, in memory (e.g., in the database 104, in memory 304 associated with the computing device 102, etc.). In this manner, the model architecture is incrementally trained over the images in the training data set, whereby the performance is continually enhanced.

It should be understood that the model architecture 110 may be trained in a single iteration (as generally described above) or may be trained through multiple iterations. For example, the model architecture 110 may be trained in multiple iterations, where the output of earlier iterations are used as a training set for a later iteration (alone or in combination with other training data). As such, in FIG. 4, optionally (as indicated by the dotted lines), for example, the computing device 102 may determine, at 426, whether a further or another iteration of training the model architecture 100 is required. When a further iteration is required, the computing device 102 defines, at 428, a next training data set, which includes images, masks, and classifier data. The training data set may include data from the prior iteration and/or new data generated from the trained model (e.g., at step 432, etc.)

What's more, optionally, for example, in connection with one or more of the iterations, the computing device 102 may filter, at 430, the training data set based one or more characteristics of the images/masks in the data set. For example, the filtering may be based on preserving certain input images, such as, for example, less "noisy" input images/masks and to exclude other images/masks.

In one embodiment, for example, the computing device 102 filters, at 428, the images/masks in the defined training data set based on similarity between the generated output masks and greenness-based masks generated from the same input images. The greenness-based masks may be defined by the NDVI value for each of the images, which is generally the difference between the near infrared (NIR) band and the red band divided by the sum of the NIR band and the red band (e.g., (NIR−red)/(NIR+red), etc.), for each pixel of the image, and which may then be compared to one or more thresholds to create the greenness-based mask. It should be appreciated that other greenness metrics may be used to construct a greenness-based mask. Based on the comparison, the computing device 102 may then filter out one or more of the images in the training data set. In doing so, for example, the training data set may be filtered to promote less noisy labels or less weedy plots, improving the performance of model architecture 110. In particular, for example, the computing device 102 determines similarity of the generated output masks (from the first-iteration, from the trained model architecture 110, etc.) and greenness-based masks, based on Equation (3) below.

$$IoU = \frac{\text{Intersection}}{\text{Union}} \qquad (3)$$

In connection therewith, the intersection of the two masks is defined by the pixels that are in both of the masks, and the union is defined by the pixels that are in either of the two masks. Based thereon, Equation (3) generally provides the IoU (or intersection over union) score, which is indicative of the noisiness of the non-crop attributes and the crop attributes is the masks. The lower the IoU score, in general, the more noise in the comparison of the masks, whereby a threshold may be employed to permit images/masks to be included in a next iteration of the training data set. Additionally, or alternatively, canopy coverage (CCVR) may be employed to filter images. Here, the computing device 102 determines the canopy coverage score based on Equation (4) below.

$$\text{Canopy Coverage Score} = \frac{\sum \text{binary\_mask}}{LEN(\text{binary\_mask})} \qquad (4)$$

The canopy coverage score is indicative of the coverage of the canopy for the mask as a ratio. The IoU and canopy coverage scores for the masks/images included in the training data set may then be used, alone or in combination, to filter out certain mask/images from the data set. For instance, the IoU may be weighted or otherwise normalized by (or based on) the canopy coverage. For example, a larger impact on IoU may be provided in instances where canopy coverage is relatively high (e.g., presence of larger plants with more canopy, etc.) (e.g., when the canopy coverage score is relatively high, etc.). To this point, the more canopy coverage, the larger the masks and, thus, the more the union and the smaller the intersection (with respect to IoU), whereby the combination of IoU and canopy coverage may be instructive of performance of the trained model.

Beyond that, the scores may be used as input data, along with the masks/images, in some embodiments, to train another model classifier, whereby filtering may be accomplished in an unsupervised manner. The model classifier may be employed to filter one or more iterations of training data sets as required or desired. That said, combinations of the IoU and the canopy coverage may be used in connection with a learning model to designate certain images/masks as noisy (or more noisy). For example, where certain ones of the images/masks are known to be noisy, the corresponding IoU and canopy coverage scores may be used (in combination with noisy labels, and also other images/masks known to be non-noisy along with non-noisy labels) as training data for the learning model. Once trained, then, the model is configured to identify other noisy images/masks based on consistent IoU and canopy coverage scores.

More generally in the above example, the training data set may include images as defined by various bands of wavelengths (e.g., within the electromagnetic spectrum, etc.) representative of the images. For example, the images may include data (or wavelength band data or band data) related to the color red (e.g., having wavelengths ranging between about 635 nm and about 700 nm, etc.), the color blue (e.g., having wavelengths ranging between about 490 nm and about 550 nm, etc.), the color green (e.g., having wavelengths ranging between about 520 nm and about 560 nm, etc.), and NIR (e.g., having wavelengths ranging between about 800 nm and about 2500 nm, etc.), etc.

With continued reference to FIG. 4, the training data set is employed by the computing device 102 in the steps above (steps 404-424) to train the model architecture 110 (in the iterations). At 426, then again, the computing device 102 determine if a next iteration is required, and the computing device proceeds to 428, or not, whereby the model architecture 110 is trained.

After the above training, the model architecture 110 may be included in one or more computing devices (e.g., the computing device 102, etc.), to configure the computing devices to generate masks for input production images. As such, in the method 400, the computing device 102, through use of the model architecture 110 (as modified), can then generate, at 432, masks for the production images. The masks for the production images may then be applied, by the computing device 102, to the production images to block non-crop attributes of the production images and thereby allow only the crop attributes in the images. The masked images are then employed, by the computing device 102, to determine phenotypic data about the crops/plots represented by the production images (as masked).

FIGS. 6A-6B illustrate example input production images 600-604 for soy and corn crops and, also, respective masks for the input images. It should be appreciated that the example input production images 600-604 are color images (even though illustrated herein in gray scale), whereby certain information of the color images may then be used as described herein. In FIG. 6A, for example, the model architecture 110 provides enhanced performance in generating masks 606, 608 for soy input images 600, 602, as compared to greenness-based masks 610, 612 generated from the same input images 600, 602 by conventional techniques. What's more, in FIG. 6B, because the model architecture 110, through training, learns the shape of the crop (e.g., corn in this example, etc.) through the classifier 118, the trained model architecture 110 is suited to generate an accurate mask 614 for the given input production image 604 of the corn crop, even with the input image 604 including substantial non-crop attributes, for example, weeds, etc., as compared to a greenness-based mask 616 generated by conventional techniques.

Additionally in the method 400, or alternatively, the mask for the production images may define a further training data set, where the input images are preserved, the resulting masks are included in the model architecture 110, and then the classification data is determined from the masks (e.g., when the masks are specific to corn, the crop is identified as corn in the classifier data; etc.). In this manner, the training may be extended to a further incremental training or learning session, whereby successive data sets are used to train the model architecture 110 over time.

Still further in the method 400, the generated masks may be used to locate (e.g., map, etc.) the crop attributes (e.g., the crops, etc.) and/or the non-crop attributes (e.g., the weeds, etc.) in one or more production fields, for example, based on a relative position of the masks/images (e.g., in the production field, etc.) and/or location data associated with the masks/images. For instance, once the mask(s) is/are generated (and, potentially, identified as accurate), the masks may be cross-referenced and/or identified to location data for the production field(s) (e.g., GPS data associated with the underlying image(s) of the production field(s), etc.). Based on the cross-reference, a particular location of the crop attributes may be determined. In addition, by further use of a greenness mask (or other vegetative mask), the location of non-crop attributes may also be determined. In connection therewith, then, the method 400 may include generating one or more maps to locate the crop attributes (e.g., the crops, etc.) and/or non-crop attributes (e.g., the weeds, etc.) in the production field(s). In turn, the method 400 may further include storing the generated map(s) in memory, and/or transmitting the maps to one or more users and/or one or more agricultural implements (e.g., sprayers, cultivators, harvesters, etc.) for use in implementing (by the user, automatically by the agricultural implement, etc.) an agricultural action based on the map and the locations of crops (broadly, crop attributes), weeds (broadly, non-crop attributes), etc. identified in the map (e.g., spraying weeds, harvesting crops, etc. based on the map; etc.).

In view of the above, the systems and methods herein may provide for enhanced training of a model architecture by leveraging classification of crops in connection with training of the model architecture. In particular, by including different decoders (each specific to a type of crop) and a classifier for distinguishing the crops, each of the decoders is trained to the specific crop for which it is designated. Consequently, a decoder for corn, for example, when trained, will not provide for segmentation of an image including a soy crop (or other crop), whereby specialized decoders (within the same model architecture) are defined. The decoders, therefore, operate to generate masks more accurately and more consistently as to non-crop attributes on the inputs, especially where the inputs exhibit non-crop attributes consistent with the crops (e.g., as defined by greenness, etc.).

In addition, in connection with the generated masks, the computing device 102 may optionally enhance the masks, for example, by generating a derivation of the masks. In this example embodiment, for instance, the computing device may generate a non-attribute mask, which may be specific to weeds. For example, the computing device 102 may generate a greenness-based mask, as described above, and then subtract a crop mask (e.g., as generated at 432 in the method 400, etc.). In doing so, the difference identifies areas of the input image in which the greenness-based mask covers, but the crop mask does not, which are areas that non-crop vegetation exists. The non-crop vegetation masks may then be used in a variety of applications, including, for example, defining spray prescriptions and/or times based on the mask for location and/or proliferation of non-crop vegetation in the field, etc.

With that said, it should be appreciated that the functions described herein, in some embodiments, may be described in computer executable instructions stored on a computer readable media, and executable by one or more processors. The computer readable media is a non-transitory computer readable media. By way of example, and not limitation, such computer readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should also be appreciated that one or more aspects of the present disclosure may transform a general-purpose computing device into a special-purpose computing device when configured to perform one or more of the functions, methods, and/or processes described herein.

As will be appreciated based on the foregoing specification, the above-described embodiments of the disclosure may be implemented using computer programming or engineering techniques, including computer software, firmware, hardware or any combination or subset thereof, wherein the technical effect may be achieved by performing at least one of the following operations: (a) accessing a data set included in a data structure, the data set including (i) multiple images, (ii) a mask for each of the multiple images, and (iii) classification data for each of the multiple images, wherein each of the multiple images is representative of a plot, wherein each of the masks corresponds to one of the multiple images and is indicative of non-crop attributes of the plot represented by the one of the multiple images, and wherein the classification data is indicative of a type of crop included in the plot represented by the one of the multiple images; (b) inputting each of the multiple images to a model architecture of the computing device; (c) for each of the multiple images input to the classifier: (i) generating, by an encoder of the model architecture, a latent image from the input image; (ii) generating, by a decoder of the model architecture, an output mask, from the latent image; (iii) determining, by a classifier of the model architecture of the computing device, an output classification for the crop based on the latent image, the output classification indicative of a type of the crop included in the plot represented by the input image; (iv) comparing the output mask generated by the decoder to the mask in the data set corresponding to the input image; (v) comparing the output classification of the input image from the classifier to the classification data for the input image in the data set; and (vi) modifying at least one parameter of the model architecture based on the comparisons; (d) storing the at least one parameter of the model architecture in a memory, whereby the model architecture is suited to generating masks, to distinguish between the crop and the non-crop attributes, for at least one subsequent production image of at least one production plot; (e) generating, by a second decoder of the model architecture, a second output mask, from the latent image, for the input image; (f) comparing the second output mask generated by the second decoder to the mask in the data set corresponding to the input image; (g) generating a mask for the production image of the at least one production plot; (h) applying the generated mask for the production image to the production image, to eliminate non-crop attributes of the production image; (i) determining phenotypic data from the production image after application of the generated mask; (j) generating a second test set of images; (k) repeating steps (i)— (vi) based on the images of the second data set, to further modify the at least one parameter of the model architecture, thereby providing a second iteration of training for the model architecture; and/or (1) generating a map representing one or more locations of the crop and/or the non-crop attributes in the at least one production plot, based on the generated mask for the production image and location data associated with the production image.

Examples and embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more example embodiments disclosed herein may provide all or none of the above mentioned advantages and improvements and still fall within the scope of the present disclosure.

Specific values disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may also be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "in communication with," or "included with" another element or layer, it may be directly on, engaged, connected or coupled to, or associated or in communication or included with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in processing image data associated with one or more plots, the method comprising:

accessing, by a computing device, a training data set included in a data structure, the training data set including (i) multiple images, (ii) a mask for each of the multiple images, and (iii) classification data for each of the multiple images, wherein each of the multiple images is representative of a plot, wherein each of the masks corresponds to one of the multiple images and is indicative of non-crop attributes of the plot represented by the one of the multiple images, and wherein the classification data is indicative of a type of crop included in the plot represented by the one of the multiple images;

inputting, by the computing device, each of the multiple images to a model architecture of the computing device, wherein the model architecture includes an encoder connected to a classifier, a first decoder and a second decoder;

for each of the multiple images input to the model architecture:

generating, by the encoder of the model architecture of the computing device, a latent image from the input image;

generating, by the first decoder of the model architecture of the computing device, a first output mask, from the latent image from said encoder;

generating, by the second decoder of the model architecture of the computing device, a second output mask, from the latent image from said encoder, for the input image;

determining, by the classifier of the model architecture of the computing device, an output classification for the crop based on the latent image from said encoder, the output classification indicative of a type of the crop included in the plot represented by the input image;

comparing the first output mask generated by the first decoder to the mask in the training data set corresponding to the input image;

comparing the second output mask generated by the second decoder to the mask in the training data set corresponding to the input image;

comparing the output classification of the input image from the classifier to the classification data for the input image in the training data set; and modifying, by the computing device, at least one parameter of the model architecture based on the comparisons; and storing, by the computing device, the at least one parameter of the model architecture in a memory, whereby the model architecture is suited to generating masks, to distinguish between the crop and the non-crop attributes, for at least one subsequent production image of at least one production plot.

2. The computer-implemented method of claim 1, wherein generating the latent image includes generating the latent image through incremental convolutions of the image; and wherein the model architecture defines a convolution neural network (CNN).

3. The computer-implemented method of claim 1, wherein generating the latent image includes reducing, by the encoder, a size of the input image by one quarter or less.

4. The computer-implemented method of claim 1, wherein comparing the first output mask generated by the first decoder to the mask in the training data set corresponding to the input image includes calculating a first loss indicative of a difference between a first output mask and the mask in the data structure corresponding to the image;

wherein comparing the second output mask generated by the second decoder to the mask in the training data set corresponding to the input image includes calculating a second loss indicative of a difference between a second output mask and the mask in the data structure corresponding to the image;

wherein comparing the output classification of the input image from the classifier to the classification data for the input image in the training data set includes calculating a third loss indicative of a difference between the output classification and the classification data for the input image in the training data set; and wherein modifying the at least one parameter of the model architecture is based on the calculated first loss, calculated second loss, and calculated third loss.

5. The computer-implemented method of claim 1, further comprising, as part of a next iteration of training the model architecture after storing the at least one parameter of the model architecture:

generating, through the model architecture, multiple masks and associated classifier data;

defining a next training data set, which includes, for each of the multiple masks, an input image and the classifier data; and filtering the next training data set based on greenness-based masks for the input images of the next training data set; and then inputting, by the computing device, each of the multiple images of the next training data set to the model architecture of the computing device;

for each of the images input of the next training data set:

generating, by the encoder, a latent image from the input image;

generating, by the first decoder, a first output mask, from the latent image;

determining, by the classifier, an output classification for the crop based on the latent image, the output classification indicative of a type of the crop included in the plot represented by the input image;

comparing the first output mask generated by the first decoder to the mask in the data set corresponding to the input image;

comparing the output classification of the input image from the classifier to the classification data for the input image in the data set; and modifying, by the computing device, the at least one parameter of the model architecture based on the comparisons; and storing, by the computing device, the modified at least one parameter of the model architecture in the memory.

6. The computer-implemented method of claim 5, wherein filtering the next training data set includes filtering the next training data set based on (i) an intersection of the greenness-based mask and the mask for the input image and (ii) a union of the greenness-based mask and the mask for the input image.

7. The computer-implemented method of claim 1, further comprising:

generating a mask for the at least one production image of the at least one production plot; and applying the generated mask for the at least one production image to the at least one production image, to eliminate non-crop attributes of the at least one production image.

8. The computer-implemented method of claim 7, further comprising determining phenotypic data from the at least one production image after application of the generated mask.

9. The computer-implemented method of claim 8, wherein the phenotypic data includes at least one of stand count, canopy coverage, and/or gap detection.

10. The computer-implemented method of claim 9, further comprising identifying non-crop vegetation based on a difference between the first output mask and a greenness-based mask for the input image.

11. The computer-implemented method of claim 7, further comprising generating a map representing one or more locations of the crop and/or the non-crop attributes in the at least one production plot, based on the generated mask for the at least one production image and location data associated with the at least one production image.

12. A system for use in processing image data associated with one or more plots, the system comprising:

a memory including a model architecture, the model architecture including a classifier, an encoder, a first decoder, and a second decoder, wherein said encoder is connected to each of the classifier, the first decoder, and the second decoder; and a computing device in communication with the memory, the computing device configured to:

access a data set included in a data structure, the data set including (i) multiple images, (ii) a mask for each of the multiple images, and (iii) classification data for each of the multiple images, wherein each of the multiple images is representative of a plot, wherein each of the masks corresponds to one of the multiple images and is indicative of non-crop attributes of the plot represented by the one of the multiple images, and wherein the classification data is indicative of a type of crop included in the plot represented by the one of the multiple images;

input each of the multiple images to the model architecture;

for each of the multiple images input:

(a) generate, via the encoder of the model architecture, a latent image from the input image;

(b) generate, via the first decoder of the model architecture, a first output mask, from the latent image and generate, via the second decoder of the model architecture, a second output mask, from the latent image;

(c) determine, via the classifier, an output classification for the crop based on the latent image, the output classification indicative of a type of the crop included in the plot represented by the input image;

(d) compare i) the first output mask generated by the first decoder to the mask in the data set corresponding to the input image and ii) the second output mask generated by the second decoder to the mask in the data set corresponding to the input image;

(e) compare the output classification of the input image from the classifier to the classification data for the input image in the data set; and (f) modify at least one parameter of the model architecture based on (f) the comparisons; and store the at least one parameter of the model architecture in the memory, whereby the model architecture is suited to generate masks for subsequent production images of production plots.

13. The system of claim 12, wherein the computing device is configured, in order to generate the latent image, to generate the latent image through incremental convolutions reducing the size of the image to ¼ or less of the input image; and wherein the model architecture defines a convolution neural network (CNN).

14. The system of claim 12, wherein the classification data is indicative of either a first crop or a second crop, wherein the first decoder is specific to the first crop, and wherein the second decoder is specific to the second crop.

15. The system of claim 12, wherein the computing device is configured, in order to compare the first output mask generated by the first decoder to the mask in the data set corresponding to the input image, to calculate a first loss indicative of a difference between the first output mask and the mask in the data structure corresponding to the image;

wherein the computing device is configured, in order to compare the second output mask generated by the second decoder to the mask in the data set corresponding to the input image, to calculate a second loss indicative of a difference between the second output mask and the mask in the data structure corresponding to the image;

wherein the computing device is configured, in order to compare the output classification of the input image from the classifier to the classification data for the input image in the data set, to calculate a third loss indicative of a difference between the output classification and the classification data for the input image in the data set; and wherein the computing device is configured, in order to modify the at least one parameter of the model architecture, to modify the at least one parameter of the model architecture based on the calculated first loss, the calculated second loss, and the calculated third loss.

16. The system of claim 12, wherein the computing device is further configured to:

generate a mask for at least one production image of at least one production plot;

apply the generated mask for the at least one production image to the at least one production image, to eliminate non-crop attributes of the at least one production image; and determine phenotypic data from the image after application of the generated mask, wherein the phenotypic data includes at least one of stand count, canopy coverage, and/or gap detection.

17. The system of claim 12, wherein the computing device is further configured to:

generate a second test set of images of a second training data set; and repeat steps (a)-(f) based on the images of the second training data set, to further modify the at least one parameter of the model architecture, thereby providing a second iteration of training for the model architecture.

18. The system of claim 17, wherein the computing device is further configured to filter the second training data set, prior to repeating steps (a)-(f), based on a greenness-based mask for the input images of the second training data set.

19. A non-transitory computer-readable storage medium including executable instructions for processing image data, which when executed by at least one processor, cause the at least one processor to:

access a first training data set included in a data structure, the first training data set including (i) multiple images, (ii) a mask for each of the multiple images, and (iii) classification data for each of the multiple images, wherein each of the multiple images is representative of a plot, wherein each of the masks corresponds to one of the multiple images and is indicative of non-crop attributes of the plot represented by the one of the multiple images, and wherein the classification data is indicative of either a first crop or a second crop included in the plot represented by the one of the multiple images;

input each of the multiple images to a model architecture, which includes an encoder connected to a classifier, a first decoder and a second decoder;

for each of the multiple images input:

(a) generate, via the encoder of the model architecture, a latent image from the input image;

(b) generate, via the first decoder of the model architecture specific to the first crop, a first output mask, from the latent image;

(c) determine, via the classifier of the model architecture, an output classification for the crop based on the latent image, the output classification indicative of a type of the crop included in the plot represented by the input image;

(d) compare the first output mask generated by the first decoder to the mask in the first training data set corresponding to the input image;

(e) generate, via the second decoder of the model architecture specific to the second crop, a second output mask, from the latent image, for the input image, wherein the second crop is different than the first crop;

(f) compare the second output mask generated via the second decoder to the mask in the first training data set corresponding to the input image;

(g) compare the output classification of the input image from the classifier to the classification data for the input image in the first training data set; and (h) modify at least one parameter of the model architecture based on the comparisons;

store the at least one parameter of the model architecture in memory;

generate a test set of images for a second training data set;

filter the second training data set based on a greenness-based mask for the set of test images of the second training data set; and repeat steps (a)-(h) based on the test set of images of the filtered second training data set to further modify the at least one parameter of the model architecture, thereby providing a second iteration of training for the model architecture.

* * * * *